United States Patent Office 2,890,164
Patented June 9, 1959

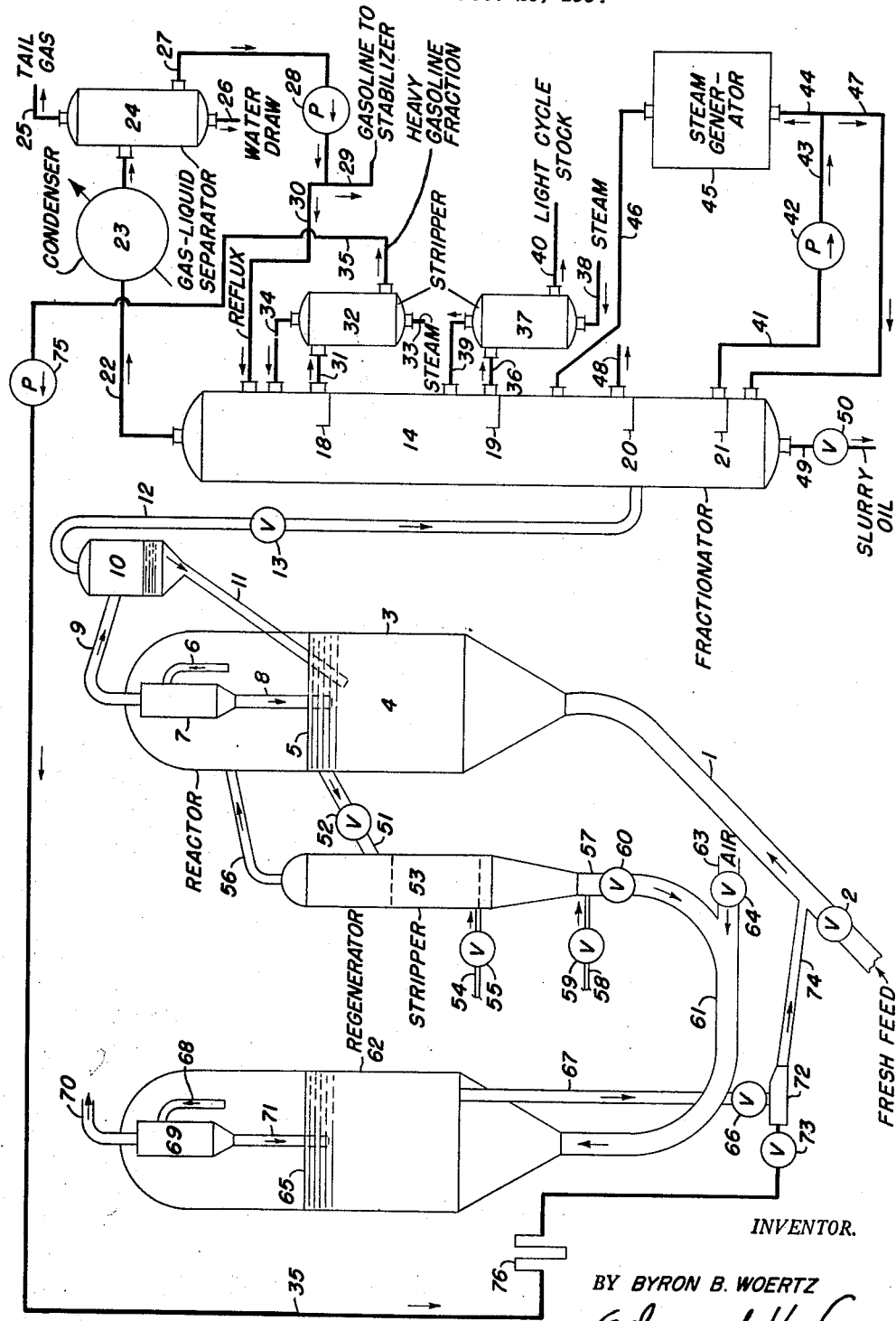
INVENTOR.
BY BYRON B. WOERTZ
ATTORNEY.

2,890,164

CATALYTIC CRACKING PROCESS

Byron B. Woertz, Crystal Lake, Ill., assignor to The Pure Oil Company, Chicago, Ill., a corporation of Ohio Application December 29, 1954, Serial No. 478,287

7 Claims. (Cl. 208—74)

The present invention relates to a process for converting hydrocarbon oil into substantially increased yields of high octane gasoline, and more particularly it relates to a method of converting cracking stocks in a fluidized cracking system using the circulating-catalyst type of operation wherein utilization is made of the heat content of the freshly regenerated catalyst as it leaves the regeneration zone and before contact with incoming fresh feed, to supply the heat required to crack a heavy gasoline fraction, or a recycled heavy gasoline fraction, at temperatures above those maintained in the main cracking zone.

Modern internal combustion engines with ever-increasing compression ratios and power outputs require gasolines which burn quickly and efficiently, leaving a minimum of carbonaceous deposits in the combustion chamber. It is now known that certain heavy gasoline ends are responsible for most of the spark plug fouling experienced today. Refiners have employed several expedients directed to overcoming this problem including adjustment of the cracking conditions to fit the inherent characteristics of the charge stock and recycling certain fractions of the products to the main reaction zone. Thus a feed hydrocarbon oil may be subjected to fractionation into light, medium, and heavy fractions, and each fraction separately subjected to cracking conditions optimum for the hydrocarbons concerned. In other methods, intermediate conversion products are separated from the cracked products in a fractionation zone and are recycled back to the incoming charge-oil line wherein they are mixed directly with partially reactivated catalyst or catalyst which has been subjected to complete regeneration. In still other methods, the intermediate boiling fractions from the cracked products are subjected to cracking in a separate cracking zone using a portion of regenerated catalyst, and the products are either transmitted to a common fractionator, or separately fractionated.

The crude gasoline fractions resulting from the cracking of heavier crude oil fractions, such as virgin gas-oil, contain certain heavy gasoline ends, that is, material boiling between about 350–425° F., which are thermally stable and resistant to further cracking in the main reaction zone. It has been found, however, that such materials may be advantageously converted if separately contacted with the hot, regenerated catalyst just prior to the entrance therein of the main oil charge. In accordance with the present invention, a heavy gasoline fraction or light, recycled gas-oil, separated from the cracked products, is separately charged to a hot catalyst transfer line sufficiently far upstream from the point at which the fresh feed is charged to the transfer line to accomplish substantial cracking of the heavy gasoline fraction or light, recycled gas-oil between the points of feed entry. Advantage is thereby taken of the presence of hot, regenerated catalyst particles within the transfer line closer to the regenerator, the higher-than-reactor temperature prevailing in the catalyst transfer line and the longer overall time of contact with the catalyst, including the time within the transfer line zone, the time in which the recycled fraction is in contact with incoming oil and hot regenerated catalyst in the line leading to the reactor, and the time within the main catalyst zone. Of prime importance is the transfer line temperature which is in excess of reactor temperature. This process is applicable to moving-bed, fluid-type catalytic cracking processes, or other circulating catalyst processes including Thermofor catalytic cracking.

The principal object of this invention is to effect catalytic conversion of hydrocarbons in the presence of a suspended catalyst wherein the hydrocarbons are caused to pass through a reaction zone, the reaction products are fractionated, and a certain heavy fraction of higher boiling gasoline hydrocarbons is recovered and passed directly to the hot, regenerated catalyst return-line, within which it eventually mixes with the incoming feed and passes to the reactor.

A further object of the invention is to provide a continuous process of catalytic cracking wherein the cracked products are separated to yield a heavy gasoline fraction of a specified boiling range apart from the balance of cracked gasoline hydrocarbon products, separately treating this heavy fraction under controlled conditions of residence time with hot regenerated catalyst in the regenerated catalyst return-line directly from the regeneration zone to accomplish substantial cracking thereof, mixing incoming feed oil with the mixture of heavy fraction and catalyst, and charging the combined mixture to the main catalyst zone. Additional heavy fraction is continuously separated from the combined cracked mixture for recycle to the hot, regenerated catalyst return-line. It is to be understood that the heavy gasoline fraction being recycled and contacted with hot, regenerated catalyst prior to entry of the feed oil into the system may be derived from fractionation of the cracked products produced from a given feed oil, or may be obtained from the cracked products of a different feed oil and used to augment the gasoline yield obtained from feed oil of a second source. It is also contemplated that heavy gasoline ends boiling in the specified range of 350° to 425° F. obtained from the combined cracked products of the aforementioned utilization of two-source feeds may also be recycled in accordance with the invention.

In general, the present process comprises an improved method of operating catalytic cracking processes and applies to all such processes wherein it is desired to produce a lower end-point gasoline without economic loss or changes in the equipment. This invention may be applied to any catalytic cracking process having particular application to continuous processes and will be described, although without limitation, in connection with a fluid-type operation using cross-flow between the fluid reactor zone and a fluid catalyst regeneration zone. In these operations the reactor and regenerator conditions are selected in accordance with the feed characteristics, the degree of cracking desired per pass and the desired character of the product. For purposes of this invention, reactor temperatures may range from above 750° F. to as high as 950° to 1000° F. using atmospheric to superatmospheric pressures and space velocities from 0.5 to 10 parts of oil per hour per part of catalyst.

The feed oil may comprise any hydrocarbon material capable of producing gasoline-boiling-range hydrocarbons on being subjected to cracking conditions. The feed oils, obtained from various crudes, may comprise those hydrocarbons having boiling ranges between about 400 to 1000° F. and will include such materials as virgin gas-oils, heavy cycle stocks, light cycle stocks, and mixtures thereof, which are capable of producing heavy cracked gasoline hydrocarbons boiling in the range of 350° to 425° F. for recycle in accordance with the invention. These preferred feeds are distillates from Gulf Coast and Mid-Continent crudes which do not have excessive carbon contents, that is the Conradson carbon residue should be below 1.0 weight percent.

The conditions used in regenerating the catalyst are designed to oxidize carbonaceous materials and other contaminants from the surfaces of the catalyst particles and revivify the catalyst to its original activity. For this purpose temperatures in the regeneration zone are generally higher than those in the reactor, being in the range of 1000° to 1250° F., with pressures comparable with those in the reactor, namely, atmospheric to superatmospheric. Any oxidizing medium may be used including air and mixtures of oxygen and inert gases. The only limitation attaching to the regeneration conditions is that they are more severe than the reactor conditions so that advantage can be taken of the greater heat content of the regenerated catalyst.

Any suitable cracking catalyst may be used, such as bauxite, alumina, acid-treated kaolin, silica-gel, alumina-gel, fuller's earth, acid-treated bentonite, diatomaceous earth, synthetic silica-alumina gels and natural clays and the like which are adapted to fluidization. These catalytic materials may be used alone or in admixture and may include various known promoters.

Reference is now made to the accompanying drawing which represents in diagrammatic form one system applicable to the process of the present invention: Hydrocarbon feed preheated sufficiently to vaporize a substantial portion thereof is introduced into line 1, through valve 2, wherein it mixes with hot, regenerated catalyst coming from reactor transfer line 74 (to be described). The mixture of feed and catalyst passes to reactor 3 maintained under cracking conditions. A fluidized reaction zone 4 is maintained with upper level 5 within reactor 3 by suitable space velocities and pressure control means well-known in the art. After sufficient residence time within zone 4, the reaction products, catalyst and any unreacted feed are withdrawn through line 6 into separator 7 wherein the entrained catalyst particles are separated by cyclonic action for return to the reaction zone through line 8. Reaction products and any remaining catalyst fines pass through line 9 and enter separator 10 which removes the remaining portion of catalyst fines and returns them to the reactor by line 11. Reaction products substantially freed from catalyst fines pass through line 12 and valve 13 into fractionator 14 near the bottom. Fractionator 14 may be any type of fractionator suitable for fractional distillation, such as that shown fitted with plates 18, 19, 20 and 21, for the separation of the various fractions in accordance with the characteristics of the reaction products.

Overhead, comprising gasoline fractions boiling in the range of about 90° to 350° F., is removed by means of line 22 and pass through condenser 23 into gas-liquid separator 24. Tail-gas is removed at line 25 and any water present as a result of superheated steam used to conduct the distillation is collected in the bottom of separator 24 for withdrawal through line 26. Liquid gasoline product is withdrawn through 27 by pump 28. This product may be sent to a stabilizer (not shown) via line 29 or all or part thereof may be returned by line 30 to the top of fractionator 14 as reflux. Plate 18 serves to remove a heavy gasoline fraction, in liquid form, boiling between about 350–425° F., which passes through line 31 to stripper 32. Steam is introduced into stripper 32 by line 33 and any lighter hydrocarbons present are removed and conducted by line 34 back to fractionator 14 as reflux. The stripped, liquid, heavy gasoline fraction is removed by line 35 and carried back to the hot, regenerated catalyst line, to be described. The boiling range of the heavy gasoline fraction must be within about 350–425° F. in order to obtain the increased yields of the present invention and accordingly the boiling range of the original fraction withdrawn at line 35 should be checked and, if found to contain materials boiling outside this range, it should be refractionated in a separate fractionator (not shown). The initial boiling point of this fraction may be as high as 375° F. but the end boiling point should not be over about 425° F.

Plate 19 serves to remove a light cycle stock sent through line 36 into stripper 37 operating by means of steam introduced in line 38. Light ends from this fraction are sent back to fractionator 14 by line 39, and the light recycle stock is withdrawn at line 40.

A portion of heavy cycle stock is withdrawn from fractionator 14 at plate 21 through line 41, is conveyed by means of pump 42 and lines 43 and 44 into steam generator 45, and returned to the fractionator by line 46 at a point somewhat above the feed entry line 12. Since the fractionator feed passing through line 12 is in vapor form, some cooling of the bottom portion is desirable. A portion of the heavy recycle stock may be sent back to fractionator 14 by line 47. Still another high-boiling fraction may be removed by plate 20 at line 48 for recycling. A slurry-oil is removed from the bottom of fractionator 14 by line 49, controlled by valve 50, for recycle to the reactor through line 1. It is preferred to operate the fractionator so that the catalyst concentration of the residuum withdrawn is below ½ lb. per gallon. The fractions removed from lines 41, 48 and 49, if in the normal light or heavy recycle stock boiling-range may be recharged to line 1 after proper reheating.

A portion of the catalyst is separated from reaction zone 4 and passed through line 51 and valve 52 into stripper 53. Steam is introduced into stripper 53 at line 54 and valve 55. Any entrained reaction products in the catalyst are conveyed by line 56 back to reactor 3. Aerating steam may also be introduced in stand-pipe 57, through line 58 and valve 59. Valve 60 in stand-pipe 57 controls the flow of used catalyst through line 61 into regenerator 62. Regenerator 62 may be the ordinary fluid-type regenerator wherein heated air is introduced at line 63 controlled by valve 64. The mixture of catalyst and air maintains a fluid bed, represented by level 65 in regenerator 62, which is controlled by the rates of flow of material input and output in the regeneration zone. The rate of removal of regenerated catalyst is controlled by valve 66 in stand-pipe 67. The mixture of combustion gases and catalyst within regenerator 62 passes via line 68 into separator 69 wherein the combustion gases from the regeneration are removed and conveyed from the system by line 70, and any entrained catalyst is returned to the regenerator by line 71. Hot regenerated catalyst leaving stand-pipe 67, controlled by valve 66, is continuously passed into injector 72 wherein it meets and is thoroughly mixed with the heavy gasoline fraction being recycled through line 35 and controlled by valve 73. This mixture passes directly into transfer line 74 wherein cracking conditions are maintained. Pump 75 in line 35 provides the necessary pressure for this operation and heater 76 is used to preheat the recycle material and vaporize a substantial portion thereof prior to its contact with the hot, regenerated catalyst. The recycle material enters injector 72 at a temperature of about 450° to 800° F. The regenerated catalyst is at a substantially higher temperature than the recycle material making it possible to employ a minimum amount of preheating in heater 76. The quantity of regenerated catalyst is great as compared with the quantity of recycle material so that complete vaporization of the hydrocarbons within line 74 is accomplished with very little reduction in the overall temperature.

The recycled heavy gasoline undergoes cracking within reactor line 74 at regeneration temperatures or slightly lower. Line 74 is preferably designed to slope downwardly at a slight angle from injector 72 toward line 1. This provides easy passage of the reactants and catalyst therethrough at linear velocities of 6 to 10 feet per second, with residence times within the length of line 74 ranging from 0.5 to 5.0 seconds. Best results, it has been found, are obtained if line 74 is about 10 to 20 ft. long with the vertical distance from the horizontal at the junction with injector 72 being about 1 ft. This arrangement allows the reactants and the catalyst to flow in a fluidized condition at a linear velocity of about 8 ft. per second, giving a residence time of about 1.3 seconds prior to admixture with the preheated fresh incoming feed in line 1.

The reactant mixture of recycled heavy gasoline ends and hot, regenerated catalyst, after passing through reactor line 74, meets the incoming, preheated feed in line 1, and the combined mixture passes to reaction zone 4. Advantage is thereby taken of the greater temperature of the regenerated catalyst with isolated contact conditions in line 74, and the extended contact times brought about in line 74, line 1 and zone 4 to thoroughly crack the heavy gasoline ends and improve the product yield and quality.

Referring to the drawing in more detail, a specific example of the present invention is as follows:

A virgin gas-oil boiling above 400° F. is preheated to about 600° F. and injected into line 1 at a rate of about 180 mols per hour along with about 35 mols per hour of steam. This feed mixture meets hot, regenerated catalyst, comprising microspherical-grade, synthetic silica-alumina, issuing from reactor line 74 at a rate of about 600,000 lbs. per hour. The regenerated catalyst, at a temperature of about 1070° F. and traveling at about 5.4 feet per second, forms a reactant-catalyst mixture in line 1 which is at a temperature of about 920° F. under a flow velocity of about 30 feet per second. The mixture enters zone 4 at about 13 p.s.i.g. and the velocity falls to about 0.7 foot per second in the lower portion thereof. Zone 4 is maintained at a temperature of about 900° F. to 950° F. with a linear velocity of about 1.3 feet per second at its mid-point. Reaction products and entrained catalyst leave through line 6 at about 1.7 feet per second and, after separation of entrained catalyst, proceed to fractionator 14. Fractionator 14 is operated to obtain a fraction boiling between 350° to 425° F., which is conveyed by line 35, and pump 75 to heater 76. In heater 76, the recycle material is preheated sufficiently to vaporize same and passed through valve 73 into injector 72.

The regenerator 62, operated at about 1070° F., that is, 170° higher than reactor 3, furnishes hot, regenerated catalyst passing downwardly through stand-pipe 67 at a rate of about 5.4 feet per second. About 20 mols per hour of recycle material is injected into the hot, regenerated catalyst so that the average temperature in reactor line 74 is 1050° F. and the residence time is 1.3 seconds. Once the process is underway, the incoming feed continuously meets and mixes with the reactant mixture of hot regenerated catalyst and recycle material coming from line 74.

It has been found that by practicing the present invention in accordance with the procedure, just outlined, from one to 5 mols per pass more gasoline boiling below about 350° F. may be produced than is produced by introducing the recycle material and fresh feed at a common point, that is without contact of the specified range of recycle material with the hot, regenerated catalyst prior to entry of the feed.

Some deviations from the conditions given in the example and description so far given may be practiced without departing from the scope of the invention as long as the following three prerequisites are satisfied, namely, that the regenerated catalyst is maintained in contact with the recycle material out of contact with the feed oil at a temperature higher than the main reaction temperature, the boiling range of the recycle material is such that it represents at least a portion of the heavy gasoline ends of the cracked products, and sufficient residence time between the hot, regenerated catalyst and the recycle material is provided to establish thermal equilibrium therebetween, or to at least initiate cracking of the recycle material, which reaction is continued in line 1 and substantially completed in the main reaction zone. Regarding the temperatures within reactor line 74, beneficial results are obtained if the average temperature is at least about 100° F. up to about 300° F. higher than the average reactor temperature. Since the reaction temperature will vary between above 750° F. to as high as 1000° F., depending on the reactants, catalyst and desired results, the aforestated 100° to 300° F. temperature differential is subject to some variation. When the average reactor temperature is about 900° F., it is found that a temperature of about 150° F. higher, or 1050° F., within line 74 is optimum using a virgin gas-oil feed. For other more refractory, lower-boiling feeds, higher cracking temperatures in the main reactor may be used, in which event it may or may not be necessary to apply the maximum of 300° F. differential for the temperature in line 74. At any rate, coking conditions are to be avoided. With some higher boiling feed-oils, the lower range of reaction temperatures may be used where the type of hydrocarbons in the recycle material may be non-refractory and require less severe conditions, i.e., using a 100° F. differential between the reactor temperature and the temperature in line 74.

Such conditions as pressures, flow rates, and proportions of materials may be varied without departing from the spirit of the invention. Preferred space velocities within zone 4 of the reactor are 2.0 to 3.0 using pressures of from 10 to 25 p.s.i.g. with temperatures ranging from 850° to 950° F. The temperatures within reactor line 74 may be varied between above about 950° F. to 1250° F. using pressures similar to those in the reactor. About 20 to 40 mols per hour of recycle material preheated to temperatures ranging from 600° to 1000° F. may be passed through injector 72.

In the example cited, the process is being started up and the feed oil meets only hot, regenerated catalyst in line 1 during the initial stages. Once the process is under way, a continuous supply of recycle material is available and subsequent feed oil entering through line 1 meets and mixes with recycle material and hot, regenerated catalyst from line 74. As the process is continued, especially when using certain types of feed oil, it may be found that there is a build-up of recycle material within the specified boiling range which is beyond the capacity of the unit. In this event, portions of the recycle material are removed from the system and only part thereof is recycled. Another alternative would be to process the recycle material alone until its volume is reduced. Also, the aromatic content of the recycle material may increase as the process proceeds. This aromatic material may be removed by fractionation or solvent extraction, and the raffinate or non-aromatic portions returned for recycle. Thus, the invention is not to be limited to recycling all of the 350 to 425° F. fraction produced from a given feed oil, and adjusted portions may be used depending on the capacity of the units, the characteristics of the desired products, and the conditions applied. In general, from 10 to 25 mol percent of the total feed passing to the main reaction zone will comprise recycle material.

It is also contemplated that the 350° to 425° F. boiling-range, heavy gasoline fraction may be further segregated into two or more narrow fractions which are injected into the hot regenerated catalyst in line 74 at spaced points or in intermittent periods. In this embodiment the higher boiling, segregated fraction, being less refractory, is given less contact time within line 74 and the lighter, segregated fraction is given greater contact time by injecting the former at a point nearer the junction with line 1 and the later through injector 72.

Although the process has been described and exemplified in terms of its preferred modifications, it is understood that various changes may be made without departing from the spirit and scope of the disclosure and of the claims.

What is claimed is:

1. The process of cracking hydrocarbon oil in the presence of finely divided catalyst to produce high octane gasoline which comprises contacting said oil and catalyst in a fluid reaction zone maintained at about 750° to 100° F., separating a heavy cracked fraction of gasoline hydrocarbons boiling between about 350° to 425° F. from the reaction products and used catalyst, conducting said used catalyst to a regeneration zone maintained at about 1000° to 1250° F. under oxidizing conditions to burn carbonaceous deposits therefrom, separating hot regenerated catalyst from said regeneration zone, returning said hot regenerated catalyst through a catalyst return line to said fluid reaction zone, preheating said heavy cracked fraction to a temperature of about 450 to 800° F. contacting said preheated heavy cracked fraction in said catalyst return line with said hot regenerated catalyst at a temperature of about 100° to 300° F. higher than in said fluid reaction zone, maintaining said heavy cracked fraction within said catalyst return line for a residence time ranging from about 0.50 to 5.0 seconds sufficient to further crack said fraction and thereafter mixing incoming feed oil with the resultant mixture of hot regenerated catalyst and cracked heavy fraction in said catalyst return line and conducting the total mixture to said fluid reaction zone.

2. The process in accordance with claim 1 in which said fluid reaction zone is maintained at about 900° F., and said hot, regenerated catalyst and preheated heavy cracked fraction are contacted at an average temperature of about 950° F. for 1.3 seconds residence time in said catalyst return line.

3. The method in accordance with claim 1 in which the heavy cracked fraction is further segregated into at least two fractions and the preheated lower boiling portion is given a longer residence time with said hot, regenerated catalyst than the preheated higher boiling portion in said catalyst return line.

4. The method in accordance with claim 1 in which the hot regenerated catalyst and preheated heavy cracked recycle fraction flow in fluidized condition at a linear velocity of between 2 to 30 feet per second in said catalyst return line.

5. A hydrocarbon conversion process which comprises passing a hydrocarbon feed oil, capable of being converted into high octane gasoline, in admixture with finely divided cracking catalyst into a fluidized reaction conversion zone maintained at a temperature of about 750° to 1000° F., separating the reaction products into gasoline fractions including a heavy cracked fraction boiling between about 350° to 425° F., conducting said used catalyst to a regeneration zone to produce regenerated catalyst at a temperature differential of about 100° to 300° F. higher than said conversion zone temperature, preheating the total of said heavy cracked fraction, constituting about 10–25 mol percent based on the total hydrocarbon feed oil charged to said fluidized reaction zone, to a temperature of about 450° to 800° F., contacting said preheated heavy cracked fraction in a separate elongated reaction zone in admixture with said hot regenerated catalyst at a flow velocity of about 2 to 30 feet per second to maintain the total residence time therein at about 0.50 to 5.0 seconds to further crack said heavy cracked fraction, mixing incoming hydrocarbon feed oil with the resulting reaction mixture from said separate reaction zone and conducting the total mixture to said conversion zone and recovering a high octane gasoline fraction from the products therefrom.

6. The method in accordance with claim 5 in which the temperature within said conversion zone is about 900° F., said regenerated catalyst and said heavy cracked fraction are mixed at a temperature of about 1070° F. and are maintained at an average temperature of about 1050° F. within said separate reaction zone before mixture with said incoming hydrocarbon feed oil.

7. The method in accordance with claim 5 in which said heavy cracked fraction is fractionated into at least two portions, separately injecting each of said portions of said heavy cracked fraction in preheated condition into contact with said hot regenerated catalyst at spaced points along said elongated reaction zone whereby the lower boiling more refractory portion is given longer contact time than the higher boiling less refractory portion, said injections taking place prior to introduction of incoming feed.

References Cited in the file of this patent

UNITED STATES PATENTS

| | | |
|---|---|---|
| 2,360,349 | Kassel | Oct. 17, 1944 |
| 2,416,608 | Brackenburg | Feb. 25, 1947 |
| 2,428,532 | Schulze | Oct. 7, 1947 |
| 2,663,675 | Ewell | Dec. 22, 1953 |
| 2,742,405 | Mattox | Apr. 17, 1956 |
| 2,827,422 | Rehbein | Mar. 18, 1958 |